United States Patent [19]
Jones

[11] Patent Number: 5,588,252
[45] Date of Patent: Dec. 31, 1996

[54] MOLE GASSING DEVICE

[76] Inventor: Jerry L. Jones, 14070 290th Ave., Zimmerman, Minn. 55398

[21] Appl. No.: 592,917

[22] Filed: Jan. 29, 1996

[51] Int. Cl.$^6$ .................................................. A01M 13/00
[52] U.S. Cl. .................................... 43/124; 43/125; 43/129
[58] Field of Search ............................... 43/124, 125, 129

[56] References Cited

U.S. PATENT DOCUMENTS

| | | |
|---|---|---|
| 525,127 | 8/1894 | Barney . |
| 1,492,732 | 5/1924 | Knopf ........................................ 43/124 |
| 1,727,457 | 9/1929 | Van Meter . |
| 3,646,701 | 3/1972 | Pfaffenback . |
| 3,774,556 | 11/1973 | Poll ............................................ 43/124 |
| 4,005,976 | 2/1977 | Rombach et al. . |
| 4,026,330 | 5/1977 | Dunn .......................................... 43/124 |
| 4,413,440 | 11/1983 | Schultz ....................................... 43/124 |
| 4,597,217 | 7/1986 | Narita ........................................ 43/125 |
| 4,829,706 | 5/1989 | Perry .......................................... 43/125 |
| 4,833,818 | 5/1989 | Berta .......................................... 43/124 |
| 5,058,312 | 10/1991 | Jackson ....................................... 43/124 |
| 5,109,628 | 5/1992 | Ellefson ....................................... 43/129 |
| 5,109,629 | 5/1992 | King, Jr. et al. . |
| 5,154,018 | 10/1992 | Livinston .................................... 43/125 |
| 5,246,675 | 9/1993 | Castronovo ................................. 43/125 |

Primary Examiner—Joseph J. Hail, III
Assistant Examiner—Darren Ark

[57] ABSTRACT

A mole killing device having a direct connection to the exhaust of a small gasoline engine and conveying the fumes from the exhaust to mole passages and preventing the escape of the fumes from the passages.

4 Claims, 2 Drawing Sheets

MOLE GASSING DEVICE

BACKGROUND OF THE INVENTION

1. Field of Invention

This invention is in the field of underground animal gassing devices and more particularly, mole gassing devices.

2. Description of the Prior Art

Gassing underground animals such as moles is a long developed art such as beginning with a hand held hose as in U.S. Pat. No. 1,492,732 and the more complex devices such as in U.S. Pat. Nos. 4,065,976 and in 5,109,628 wherein the units are self contained.

Particular reference here is made to moles which have been indicated to be the most difficult of rodents to control or destroy. If left unchecked they can destroy large areas of lawn in a short time.

Efforts have been made to control or limit the growth of moles by destroying their food supply or by using a mole eradicating substance. However, these methods have not been found to be successful.

SUMMARY OF THE INVENTION

It is a primary object herein to provide an effective means to be rid of moles.

Using exhaust gas fumes from a gasoline engine appears to be a most effective means for getting rid of moles and a readily available supply of such gas fumes comes from a small gasoline engine such as of a lawn mower engine or all engine such as used with a leaf blower, a chain saw and the like.

It is another object herein in utilizing a gas connected exhaust hose to have a device to seal the exhaust gas fumes in the mole passages from leaking out to the atmosphere.

It is a further object to prevent leakage of gas fumes from passages and in loose soil conditions.

These and other objects and advantages of the invention will be set forth in the following description made in connection with the accompanying drawings in which the reference characters refer to similar parts throughout the several views.

DESCRIPTION OF A PREFERRED EMBODIMENT

Figure 1:
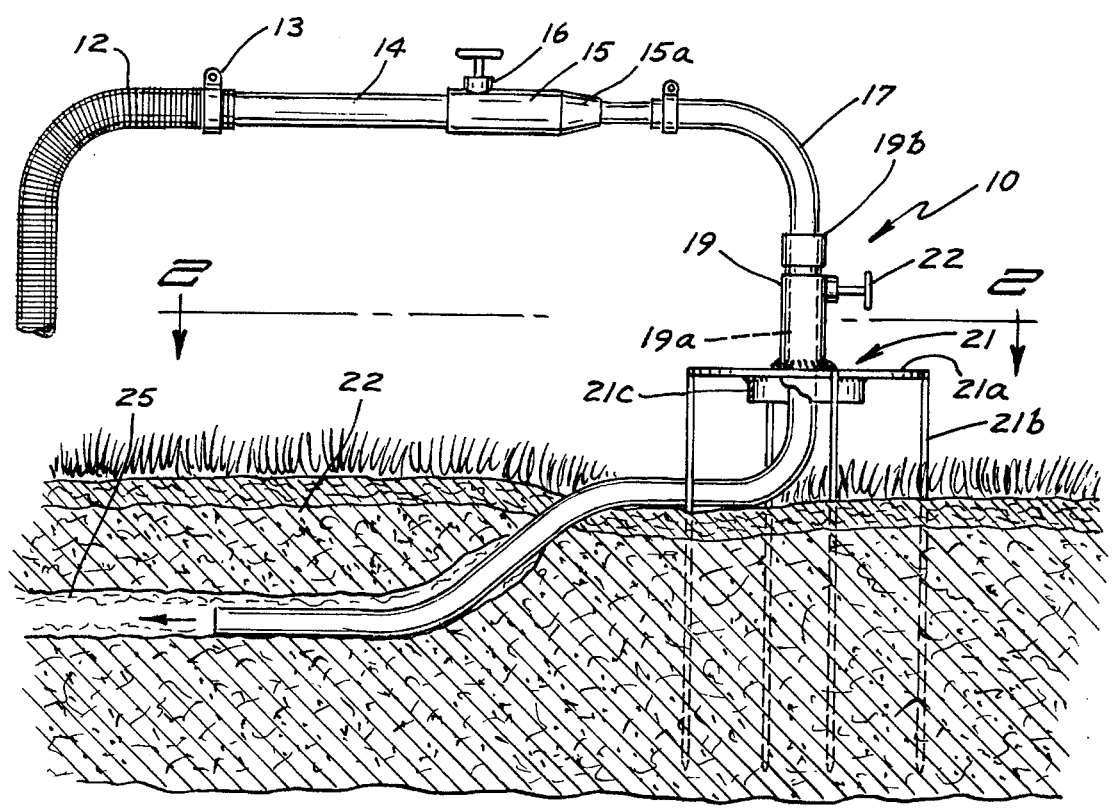
FIG. 1 is an elevational view with a portion broken away showing the invention in operating position.
Figure 2:
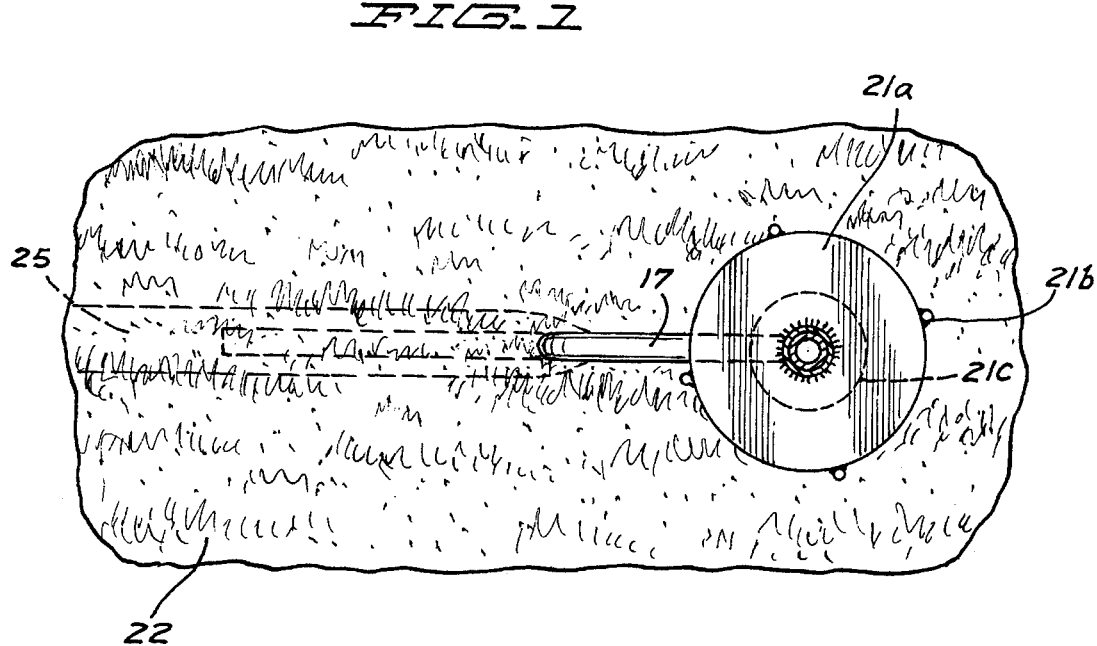
FIG. 2 is a plan view taken in line 2—2 of FIG. 1 as shown.

Referring to the drawings and particularly to FIGS. 1 and 2, shown in operating position is one embodiment of the invention herein indicated generally by the reference numeral 10.

A length of flexible hose 12 such as a ten foot length, which has been found to be a convenient length to use, is attached to the exhaust pipe as of a gasoline engine of a lawn mower which is not here shown.

The hose 12 is secured by a clamp 13 to one end of a rigid retainer pipe 14 which has its other end disposed into a retaining pipe 15 into which it is secured by a lock bolt 16. Said pipe 15 has a tapered end 15a from which a flexible hose 17 extends. Said hose may be formed of a rubber tubing. Said hose is fed through a sleeve 19. However, disposed within said sleeve 19 is a rigid retaining sleeve 19a which is retained by an annular flange portion 19b overlying the top of the sleeve 19. The inner sleeve is secured in position by a lock bolt 22 and is of such a diameter relative to the hose 17 as to have frictional engagement with said hose 17 as it is being fed through it and thus said hose is held when a sufficient length has been fed into a mole passage as illustrated in FIGS. 1 and 2.

Said sleeve 19 is mounted on a support or anchorage member 21 which has a top plate member 21a from which a plurality of rods or legs 21b depend to be secured in the ground 23 for anchorage. Depending from said plate member centrally thereof is a depending cylindrical seal 21c which under favorable ground or soil conditions serves as a partially embedded seal member as will be further described.

In the present illustration of FIG. 1, a loose, sandy or crumbly soil is indicated and as shown, the hose 17 is extended through said sleeve 19a and into a mole passage 25. Said support member will be anchored in the soil adjacent a mole passage such as passage 25 and the hose is extended sufficiently to pass into said passage the gas fumes or exhaust gasses generated by the lawn mower engine.

With the soil condition in the illustration given, the point at which the hose 17 enters the mole passage is tamped down to be firm about the hose.

With the hose feeding exhaust gasses into the mole passage it is estimated that on the order of thirty minutes is required to dispose of a mole or moles in a given passage and the same procedure follows for each mole passage.

Figure 3:
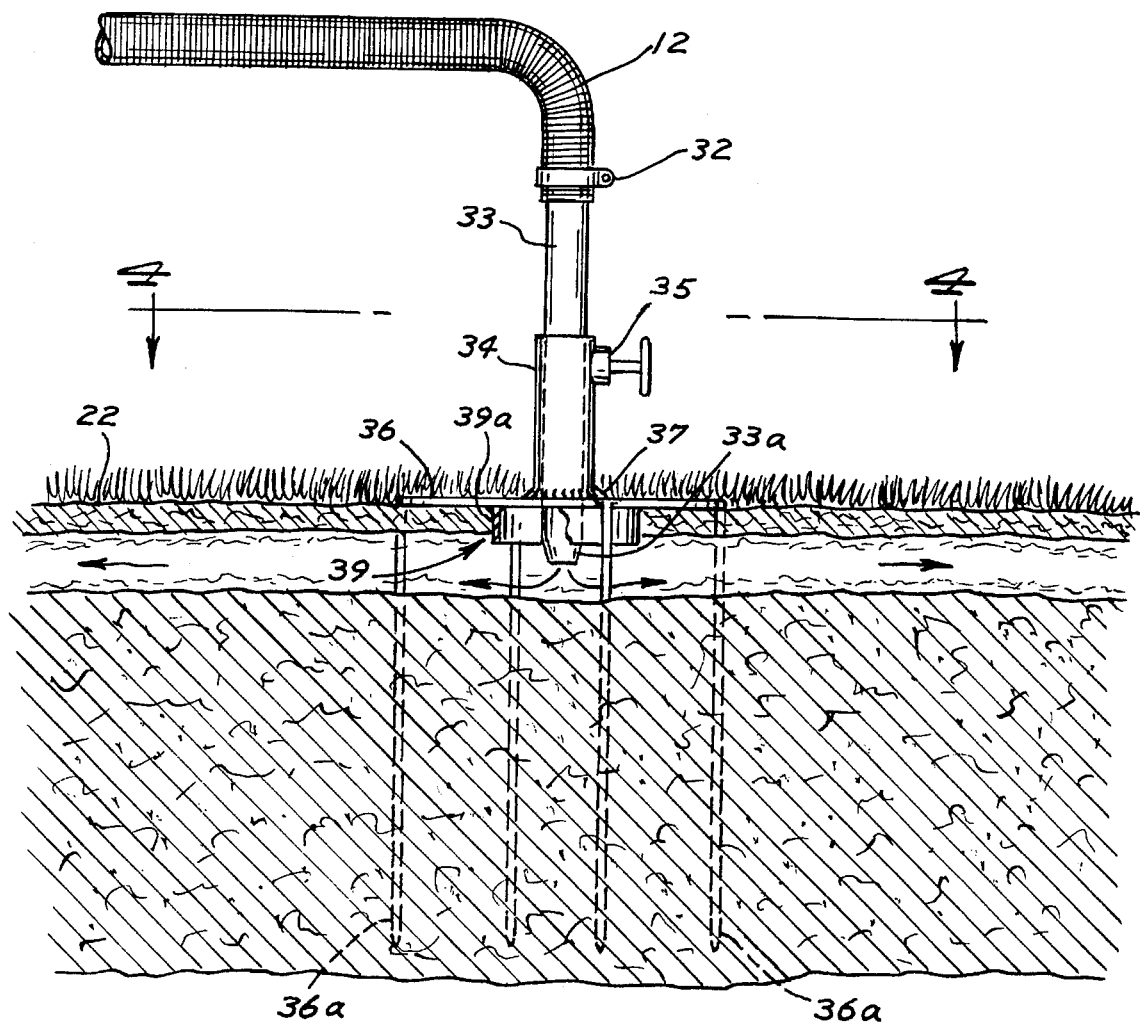
FIG. 3 is a view similar to that of FIG. 1 showing a modification; add
Figure 4:
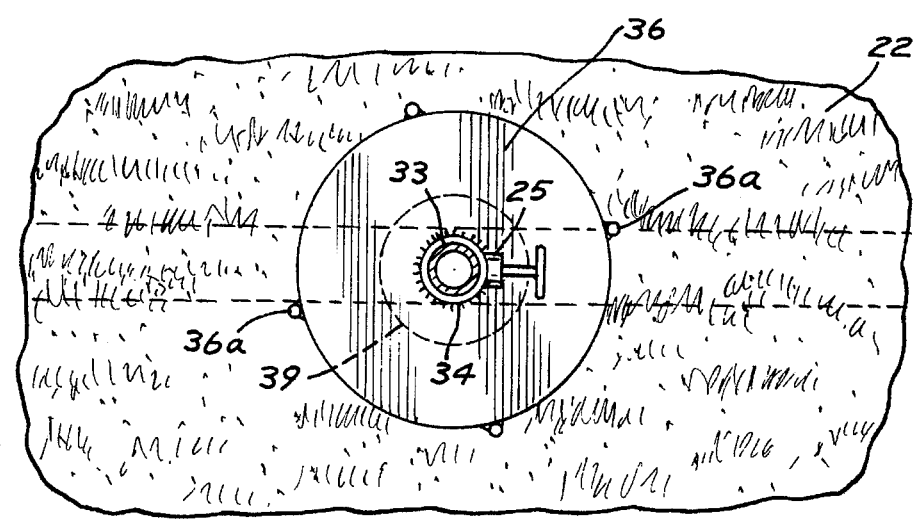
FIG. 4 is a plan view taken on line 4—4 of FIG. 3 as shown.

Reference is now had to FIGS. 3 and 4 in which a modification is shown adapted to be used with a firm surface or solid ground condition such as a grass bearing surface.

Here a flexible hose or pipe 12 extends from a gasoline engine of a lawn mower, not shown, and extends to and is secured by a clamp 32 to a rigid pipe or tube 33 which is vertically disposed into and through a sleeve 34 and securing the same is a lock bolt 22. Said tube 33 has a tapered outlet end portion 33a.

Said sleeve is upstanding from a plate member 36 which has supporting rods or legs 36a to be thrust into the ground 22 for anchorage. Said sleeve is secured to said plate member as by welding with a weld seam being indicated at 37. Depending centrally from said plate member 36 is a cylindrical seal member 39 which by penetration into the ground 23 forms a seal about the tapered end portion of the pipe 33 and prevents fumes or gas emissions from the pipe from leaking to the atmosphere. The seal member 21c of FIG. 1 has the same function when embedded in the soil.

Here with the ground or soil being in a firm condition, the mole passages although close to the surface with the surface soil compacted, gasses will not leak out to the atmosphere. The tapered end of said pipe 33 tends with back pressure to provide momentum to the passing of the gas into the mole passage. Thus it is seen that with a firm soil condition, the hose or pipe conducting the gas need not extend for any distance into a mole passage.

It was seen that with the embodiment of FIGS. 1 and 2, that the flexible hose under loose soil conditions extends into the mole passage for a distance. However, with compacted surface soil the pipe 33 need only extend to the entrance of a mole passage and here care must be exercised to just penetrate the passage with the pipe and the seal member as not to form an obstruction to the passing of the gas fumes into the mole passage.

Where the ground condition may be somewhat loose, a flexible material such as a suitable plastic or rubber material may form an inner seal as at 39a to be ground engaging to prevent the leakage of gas through the porosity of the soil about the pipe end 33a.

It is seen that with the two embodiments herein described, that a flexible hose is used with loose soil conditions to extend into a mole passage but with a fairly firm or firm soil condition, the gas fumes can be fed into a mole passage at the point where the pipe 33 just enters into a passage and here a rigid pipe is desirable.

The two embodiments herein described have proved to be very effective in getting rid of moles and they have proved to be a great boon in providing and maintaining a near appearing ground condition and particularly the appearance of a grass surface.

It will, of course, be understood that various changes may be made in the form, details and arrangement of the mole killing device herein as described and as defined in the claims.

What is claimed is:

1. A mole gassing device in connection with gas exhaust fumes produced by a gasoline engine, comprising a flexible hose conducting said exhaust fumes, a rigid pipe having said hose connected thereto, said rigid pipe having a tapered terminal portion, a tubular retainer receiving said terminal portion and having a tapered outlet end portion, a lock bolt carried by said retainer securing said rigid pipe, a second gas fume conducting hose, means connecting said second gas fume conducting hose to said retainer, a plate member having a plurality of depending legs, a sleeve upstanding from said plate member being welded thereto, a cylindrical seal member depending centrally from said plate member, said sleeve having an internal sleeve to frictionally receive and position said second mentioned gas fume conducting hose therethrough, means securing said internal sleeve internally of said sleeve, and said gas fume conducting hose communicating with a mole passage to pass exhaust gas fumes thereinto.

2. Referring to claim 1, wherein said underlying cylindrical seal member extends to being embedded in ground engagement to prevent exhaust gas fumes from leaking to the atmosphere where injected into a mole passage.

3. Referring to claim 1, wherein said internal sleeve has an upper outer end flange seating upon the upper end of said sleeve.

4. A mole gassing device utilizing gas exhaust fumes produced by a gasoline engine, comprising gas fume conducting hose, a terminal portion of said hose being fed through a sleeve, an internal sleeve within said sleeve, an annular flange as an extension of said internal sleeve supported upon said sleeve, said internal sleeve frictionally receiving therethrough said terminal portion of said hose, positioning the extension therethrough of said sleeve, means locking in position said hose within said sleeve, a plate member underlying said sleeve being integral therewith, said plate member having a plurality of depending ground engaging positioning rods, a ground engaging cylindrical seal member depending from said plate member centrally thereof, and a terminal portion of said hose extending through said plate member centrally of said seal member into a mole passage.

* * * * *